United States Patent [19]

De Martini

[11] 4,031,939

[45] June 28, 1977

[54] TIRE CHAIN APPLYING DEVICE

[76] Inventor: Joseph De Martini, 3728 Canyon Way, Martinez, Calif. 94553

[22] Filed: Nov. 11, 1975

[21] Appl. No.: 630,922

[52] U.S. Cl. .............................. 152/213 R; 254/88
[51] Int. Cl.² .................... B60C 27/00; E02C 3/00
[58] Field of Search .................. 152/213 R, 213 A; 254/88; 81/15.8

[56] References Cited

UNITED STATES PATENTS

| | | | |
|---|---|---|---|
| 1,189,632 | 7/1916 | Seitz | 152/213 R |
| 2,022,804 | 12/1935 | Garey | 254/88 |
| 2,532,149 | 11/1950 | Cone | 254/88 |
| 3,353,789 | 11/1967 | Scott | 254/88 |
| 3,893,500 | 7/1975 | Planz | 152/213 R |
| 3,937,263 | 2/1976 | Hill et al. | 152/213 R |

Primary Examiner—Drayton E. Hoffman
Attorney, Agent, or Firm—Joel Halpern

[57] ABSTRACT

A device for applying a tire chain to the tire of a vehicle includes a wheel supporting base member which is provided with a pair of wheel mounting elements in spaced relation. A central chain spacing member is slidably carried by the base member and is slidable between the wheel mounting elements to thereby establish the location of one or more transverse chain-receiving slots defined between the central spacing member and the wheel mounting elements.

5 Claims, 3 Drawing Figures

U.S. Patent  June 28, 1977  4,031,939
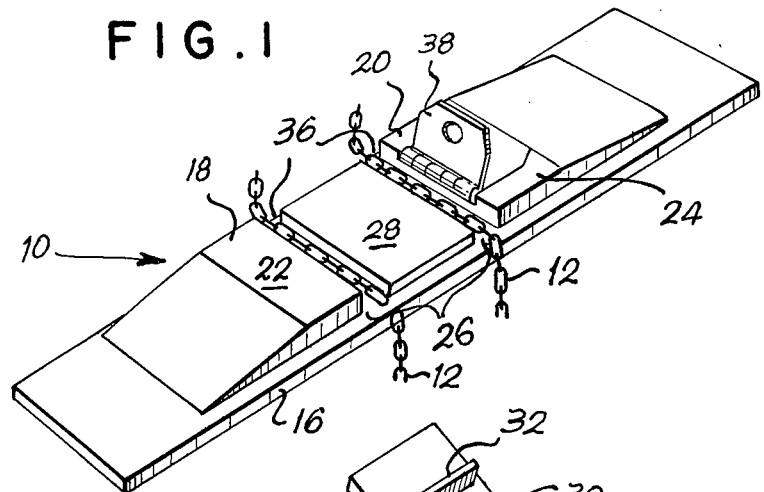
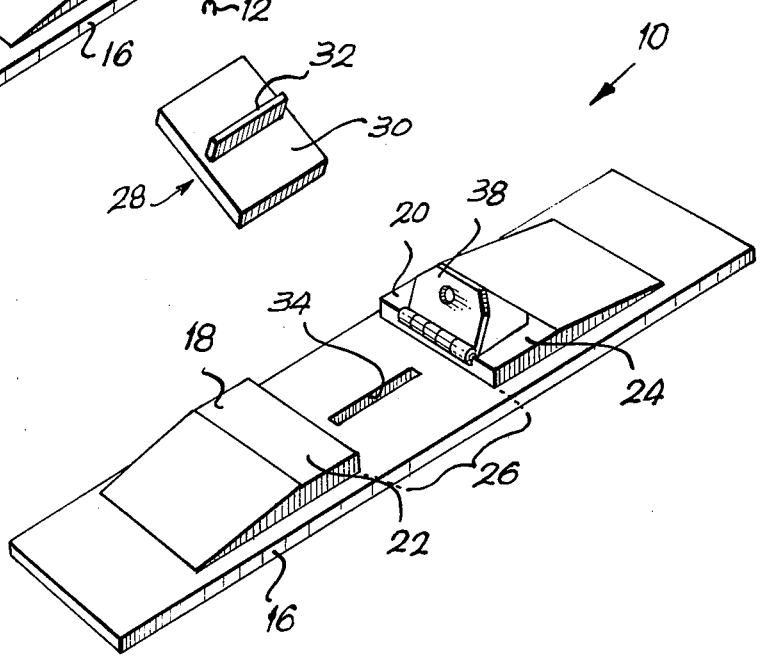
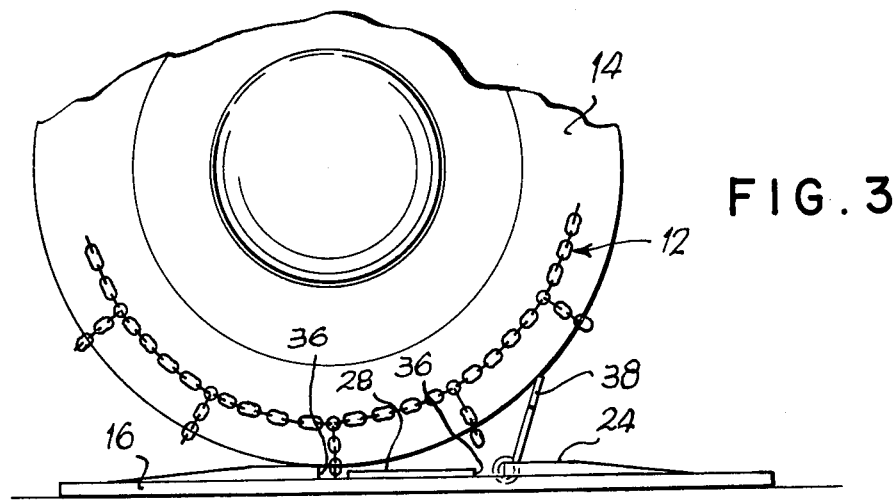

TIRE CHAIN APPLYING DEVICE

BACKGROUND OF THE INVENTION

This invention relates to devices for applying tire chains to the tires of vehicles such as automobiles and more particularly to such devices which can be easily carried and placed in position for the mounting thereof by the vehicle.

Devices for applying tire chains to tires have been well known for many years. Basically, such devices include a wheel supporting base having wheel mounting elements thereon, such as protuberances or platform elements, the mounting elements defining one or more transverse chain-receiving slots therebetween. However, with the advent of the compact (reduced size) automobile and the present day trend towards automobiles having a variety of sizes and wheel diameters it is apparent that the conventional device previously available and wherein the spacing of the wheel mounting elements and the location of the chain-receiving transverse slots is fixed affords increasingly limited use.

SUMMARY OF THE INVENTION

It is one object of the invention to provide a device for applying a tire chain to the tire of a vehicle which is utilizable with vehicles of various sizes having wheel diameters which vary considerably.

It is another object of the invention to provide a device for applying a tire chain to the tire of a vehicle which permits adjustment of the location of the chain-receiving transverse slots while the wheel of the vehicle is mounted upon the device.

Other objects and advantages of the invention will become readily apparent from the following description of the invention.

In accordance with the present invention there is provided a device for applying a tire chain to the tire of a vehicle comprising an elongated base member adapted to support the wheel of a vehicle, a pair of wheel mounting elements on said base member in longitudinally spaced relation defining a recess therebetween, and a central chain spacing member carried slidably on said base member intermediate said mounting elements within said recess defining at least one transverse chain-receiving slot between same and said mounting elements.

BRIEF DESCRIPTION OF THE DRAWINGS

In order that the invention may be more fully understood it will now be described, by way of example, with reference to the accompanying drawings in which:

FIG. 1 is a perspective view of a tire chain applying device embodying the invention showing a portion of a tire chain thereon;

FIG. 2 is an exploded view showing the central chain spacing member separated from the base member of the device; and FIG. 3 is a side view of the device of the invention supporting the wheel of a vehicle and illustrating the chain with one of its cross-links in a transverse slot of the device.

DETAILED DESCRIPTION OF THE INVENTION

Referring to the drawings there is shown generally a device 10 for applying a tire chain 12 to the tire 14 of a vehicle (not shown). The device comprises a base member 16 preferably elongated so as to be able to support a wheel of a vehicle completely off the ground. The base member is given a pair of wheel mounting elements 18, 20. Such mounting elements may be either upstanding continuations of the lower portion of the base member as depicted in FIG. 2 or, as shown in FIG. 1, they may occupy a smaller area than the lower portion of the base member. In either form such wheel mounting elements are desirably formed so as to be integral with the lower portion of the base member.

The wheel mounting elements should each be given an upper surface 22, 24 which can accommodate a portion of the tire so as not to place excessive strain on the tire. The wheel mounting elements are longitudinally spaced so as to define a recess 26 therebetween. Within the recess there is positioned a central chain spacing member 28. Such central spacing member is provided in the lower surface 30 thereof with a rib or projecting 32 which depends therefrom and is dimensioned to fit slidably within a longitudinally extending slot 34 formed in the recessed portion of base member 16. The provision of the slot and rib construction enables one to slide the central spacing member 28 longitudinally within recess 26 into the desired proximity with adjacent wheel mounting elements 18, 20. In this manner the exact size and location of one or more transversely extending tire chain-receiving slots 36 may be established.

It will be understood that the adjustability of the central spacing member 28 within the recess is of critical importance to the invention since this feature enables one to employ the device with vehicles having a wide range of wheel diameters such as reduced size automobiles and large-size trucks. The material from which the device is constructed should, of course, be capable of supporting at least onefourth the weight of such vehicles without sustaining damage.

FIG. 2 illustrates the device with a single longitudinally extending slot in the base member and with a single rib or projecting element in the under surface of the central spacing member. It will be understood that two or more of such slots and cooperable projections may be provided to afford improved guidance of the spacing element from one location to another.

The central spacing member may be constructed in the form of separable sections to provide a plurality of transversely extending chain-receiving slots. Each such section of the spacing member should be provided with the depending projection or rib to enable one to independently position the separable sections.

In a preferred embodiment of the invention the height of the central spacing element 28 is somewhat less than the height of the neighboring wheel mounting elements. In this manner the wheel of the vehicle never rests upon the spacing element. This permits one to adjust the positioning of the spacing element while the vehicle wheel is in mounted relation upon the device to vary the location and/or the size of the transverse chain-receiving slots.

It will be appreciated that in normal use the chain is first placed in position on the device with one or more of the cross-links of the chain disposed in one or more chain-receiving slots 36. The vehicle is then driven or pushed so that a wheel thereof mounts the device. The cross-links are then connected and the open ends of the chain are also connected. However, it has been found that after the vehicle is mounted upon the device either due to the size of the chain-receiving slot or its location with respect to the tire difficulty is experienced in assembling the cross-links or ends of the chain. By providing a device by which the size and/or the location of such slots can be adjusted such difficulties in assembly may be overcome. When it is recognized that the difference in circumferential length between a 13 inch and a 15 inch wheel diameter is greater than 6 inches even (the difference in circumferential length between such tires and truck tires being greater) though only a fractional portion of the wheel is mounted upon the device there is need for some degree in flexibility as regards the size and location of the chain-receiving slots to satisfactorily accommodate a wide range of wheel diameters on the device.

As shown in FIG. 1 a stop member 38, desirably in the form of a hinge may be secured to the upper surface of wheel mounting element 20 in order to limit the forward movement of the vehicle during mounting of the vehicle wheel upon the device.

From the foregoing it will be seen that a chain applying device for vehicular tires has been provided which affords enhanced utility and is capable of use with a wider range of vehicles than devices available heretofore.

I claim:

1. A device for applying a tire chain to the tire of a vehicle comprising an elongated base member adapted to support the wheel of a vehicle, a pair of wheel mounting elements on said base member in longitudinally spaced relation defining a recess therebetween, a central chain spacing member mounted movably on said base member intermediate said wheel mounting elements and within said recess, means on said spacing member and base member cooperable to selectively slide said spacing member longitudinally within said recess and thereby define at least one transverse chain-receiving slot between said spacing member and said wheel mounting elements.

2. A device according to claim 1 including at least one longitudinally extending slot in said base member within said recess and at least one depending rib element on said central spacing member dimensioned to fit into said slot, whereby said central spacing member is slidable within said recess to thereby vary the location of at least one of said transverse slots.

3. A device according to claim 2, wherein said central spacing member is longitudinally separable.

4. A device according to claim 2, wherein the upper surface of said central spacing member is below the upper surfaces of said wheel mounting elements to thereby permit longitudinal movement of said central spacing member while a wheel is being supported by said mounting elements.

5. A device according to claim 4, wherein said central spacing member is longitudinally separable.

* * * * *